United States Patent
Liu et al.

(10) Patent No.: US 10,446,855 B2
(45) Date of Patent: Oct. 15, 2019

(54) FUEL CELL SYSTEM INCLUDING MULTILAYER INTERCONNECT

(71) Applicant: LG Fuel Cell Systems, Inc., North Canton, OH (US)

(72) Inventors: Zhien Liu, Canton, OH (US); Richard W. Goettler, Medina, OH (US); Hwa-Young Jung, Canton, OH (US); Minjae Jung, Stow, OH (US)

(73) Assignee: LG FUEL CELL SYSTEMS INC., Canton, OH (US)

( * ) Notice: Subject to any disclaimer, the term of this patent is extended or adjusted under 35 U.S.C. 154(b) by 550 days.

(21) Appl. No.: 14/106,298

(22) Filed: Dec. 13, 2013

(65) Prior Publication Data

US 2014/0272660 A1 Sep. 18, 2014

Related U.S. Application Data (60) Provisional application No. 61/799,706, filed on Mar. 15, 2013.

(51) Int. Cl.
*H01M 8/0236* (2016.01)
*H01M 8/0217* (2016.01)
(Continued)

(52) U.S. Cl.
CPC ....... *H01M 8/0236* (2013.01); *H01M 8/0217* (2013.01); *H01M 8/0219* (2013.01); *H01M 8/0228* (2013.01); *H01M 2008/1293* (2013.01)

(58) Field of Classification Search
None
See application file for complete search history.

(56) References Cited

U.S. PATENT DOCUMENTS 4,631,238 A * 12/1986 Ruka ................. C25B 9/04
 252/519.15
5,342,705 A 8/1994 Minh et al.
(Continued)

FOREIGN PATENT DOCUMENTS

CN 1672283 9/2005
CN 100570941 12/2009
(Continued)

OTHER PUBLICATIONS

Fergus, Jeffrey, Lanthanum chromite-based materials for solid oxide fuel cell interconnects, Solid State Ionics 171 (2004) 1-15;15 pages total.*
(Continued)

*Primary Examiner* — Ula C Ruddock
*Assistant Examiner* — Anna Korovina
(74) *Attorney, Agent, or Firm* — Dentons US LLP (57) ABSTRACT

In some examples, a fuel cell comprising a first electrochemical cell including a first anode and a first cathode; a second electrochemical cell including a second anode and a second cathode; and an interconnect configured to conduct a flow of electrons from the first anode to the second cathode, wherein the interconnect comprises a first portion and a second portion, wherein the first portion is closer to the anode than the second portion, and the second portion is closer to the cathode than the first portion, wherein the first portion comprises one or more of doped ceria, doped lanthanum chromite, and doped yttrium chromite, and wherein the second portion comprises one or more of a Co—Mn spinel and a ABO$_3$ perovskite.

20 Claims, 5 Drawing Sheets

(51) Int. Cl.
*H01M 8/0228* (2016.01)
*H01M 8/124* (2016.01)

(56) References Cited

U.S. PATENT DOCUMENTS

| | | | | |
|---|---|---|---|---|
| 5,356,730 | A * | 10/1994 | Minh | H01M 8/0215 429/479 |
| 5,411,767 | A * | 5/1995 | Soma | H01M 8/0215 427/115 |
| 7,740,772 | B2 | 6/2010 | Gorte et al. | |
| 7,740,966 | B2 | 6/2010 | Jacobson et al. | |
| 2004/0023101 | A1* | 2/2004 | Jacobson | H01M 4/8621 429/440 |
| 2004/0028975 | A1 | 2/2004 | Badding et al. | |
| 2004/0043272 | A1* | 3/2004 | Gorte | H01M 4/8621 429/489 |
| 2004/0081893 | A1 | 4/2004 | Hansen et al. | |
| 2006/0193971 | A1 | 8/2006 | Tietz et al. | |
| 2007/0009784 | A1* | 1/2007 | Pal | H01M 4/8621 429/432 |
| 2007/0037031 | A1 | 2/2007 | Cassidy et al. | |
| 2008/0081223 | A1 | 4/2008 | Yasumoto et al. | |
| 2009/0047566 | A1* | 2/2009 | Maruyama | H01M 8/0206 429/456 |
| 2009/0123803 | A1* | 5/2009 | Faucheux | H01M 8/006 429/444 |
| 2009/0169958 | A1 | 7/2009 | Lin | |
| 2009/0186249 | A1* | 7/2009 | Narendar | H01M 8/0217 429/486 |
| 2009/0186250 | A1* | 7/2009 | Narendar | H01M 8/0217 429/486 |
| 2010/0055533 | A1* | 3/2010 | Kebbede | C23C 18/1216 429/465 |
| 2010/0129693 | A1 | 5/2010 | Nguyen et al. | |
| 2010/0178589 | A1* | 7/2010 | Kwon | H01M 4/9033 429/507 |
| 2012/0321983 | A1 | 12/2012 | Goettler et al. | |
| 2012/0321984 | A1 | 12/2012 | Goettler et al. | |
| 2012/0328972 | A1* | 12/2012 | Lu | H01M 12/08 429/535 |
| 2013/0101922 | A1* | 4/2013 | Min | H01M 8/243 429/495 |

FOREIGN PATENT DOCUMENTS

| | | | |
|---|---|---|---|
| EP | 1788653 | 5/2007 | |
| JP | H07320757 | 12/1995 | |
| JP | 2010277745 | 12/2010 | |
| JP | 2012099322 | 5/2012 | |
| JP | 2012099463 | 5/2012 | |
| JP | 2012114074 | 6/2012 | |
| JP | 5116182 | 1/2013 | |
| JP | 2013069666 | 4/2013 | |
| WO | 2006016628 | 5/2008 | |
| WO | WO-2012116188 A2 * | 8/2012 | C04B 35/42 |

OTHER PUBLICATIONS

Rabelo et al., Synthesis and Characterization of La1-xSrxMnO3-δ Powders Obtained by the Polymeric Precursor Route, Materials Research, 2011; 14(1): 91-96, DOI: 10.1590/S1516-14392011005000018.*
International Search Report and Written Opinion of counterpart International Application No. PCT/US2014/022653, dated Jun. 24, 2014, 10 pp.
International Preliminary Report on Patentability from International Application No. PCT/US2014/022653, dated Sep. 24, 2015, 9 pp.
Huang et al., "Bi-layer structures as solid oxide fuel cell interconnections," Solid State Ionics, vol. 177, Mar. 2006, pp. 347-350.
Yl et al., "Fabrication of a MnCo2O4/gadolinia-doped Ceria (GDC) Dual-phase Composite Membrane for Oxygen Separation," Journal of the Korean Ceramic Society, vol. 47, No. 2, Jan. 2010, pp. 199-204.
Huang et al., "Bi-layer structures as solid oxide fuel cell interconnections," Solid State Ionics, vol. 177, 2006, pp. 347-350.
Yl et al., "Fabrication of a MnCo2O4/gadolinia-doped Ceria (GDC) Dual-phase Composite Membrane for Oxygen Separation," Journal of the Korean Ceramic Society, vol. 47, No. 2, 2010, pp. 199-204.
Search Report and Written Opinion from counterpart Singapore Application No. 11201507302X, dated Jun. 13, 2016, 10 pp.
First Office Action and Search Report, and translation thereof, from counterpart Chinese Application No. 201480015963.7, dated Mar. 31, 2017, 11 pp.
Examination Report from counterpart European Application No. 14712176.8, dated Apr. 21, 2017, 8 pp.
Response to Search Report and Written Opinion dated Jun. 13, 2016, from counterpart Singaporean Application No. 11201507302X, filed Nov. 9, 2016, 9 pp.
Written Opinion from counterpart Singaporean Application No. 11201507302X, dated Jan. 23, 2017, 7 pp.
Response to Written Opinion dated Jan. 23, 2017, from counterpart Singaporean Application No. 11201507302X, dated Jun. 22, 2017, 6 pp.
Notice of Eligibility for Grant dated and Examination Report, Jul. 6, 2017, from counterpart Singaporean Application No. 11201507302X, 4 pp.
Office Action from counterpart Australian Application No. 2014237390, dated Sep. 27, 2017, 4 pp.
Response to Examination Report dated Apr. 21, 2017, from counterpart European Application No. 14712176.8, filed Oct. 30, 2017, 7 pp.

* cited by examiner

__(12)__ United States Patent

FUEL CELL SYSTEM INCLUDING MULTILAYER INTERCONNECT

This application claims the benefit of U.S. Provisional Application No. 61/799,706, filed Mar. 15, 2013, the entire content of which is incorporated herein by reference.

This invention was made with Government support under Assistance Agreement No. DE-FE0000303 awarded by Department of Energy. The Government has certain rights in this invention.

TECHNICAL FIELD

The disclosure generally relates to fuel cells, such as solid oxide fuel cells.

BACKGROUND

Fuel cells, fuel cell systems and interconnects for fuel cells and fuel cell systems remain an area of interest. Some existing systems have various shortcomings, drawbacks, and disadvantages relative to certain applications. Accordingly, there remains a need for further contributions in this area of technology.

SUMMARY

Example compositions and configuration for active layers of fuels cells, such as, e.g., solid oxide fuels cells (SOFCs), are described. In one example, the disclosure is directed to a fuel cell comprising a first electrochemical cell including a first anode and a first cathode; a second electrochemical cell including a second anode and a second cathode; and an interconnect configured to conduct a flow of electrons from the first anode to the second cathode, wherein the interconnect comprises a first portion and a second portion, wherein the first portion is closer to the anode than the second portion, and the second portion is closer to the cathode than the first portion, wherein the first portion comprises one or more of doped ceria, doped lanthanum chromite, and doped yttrium chromite, and wherein the second portion comprises one or more of a Co—Mn spinel and a $ABO_3$ perovskite.

In one example, the disclosure relates to a fuel cell comprising a first electrochemical cell including a first anode and a first cathode; a second electrochemical cell including a second anode and a second cathode; and an interconnect configured to conduct a flow of electrons from the first anode to the second cathode, wherein the interconnect comprises a first portion and a second portion, wherein the first portion is closer to the anode than the second portion, and the second portion is closer to the cathode than the first portion, wherein the first portion comprises one or more of doped ceria, doped lanthanum chromite, and doped yttrium chromite, and wherein the second portion comprises one or more of a Co—Mn spinel and a $ABO_3$ perovskite.

In another example, the disclosure relates to a method for manufacturing a fuel cell, the method comprising forming a fuel cell structure, the structure comprising: a first electrochemical cell including a first anode and a first cathode; a second electrochemical cell including a second anode and a second cathode; and an interconnect configured to conduct a flow of electrons from the first anode to the second cathode, wherein the interconnect comprises a first portion and a second portion, wherein the first portion is closer to the anode than the second portion, and the second portion is closer to the cathode than the first portion, wherein the first portion comprises one or more of doped ceria, doped lanthanum chromite, and doped yttrium chromite, and wherein the second portion comprises one or more of a Co—Mn spinel and a $ABO_3$ perovskite.

In another example, the disclosure relates to a method comprising controlling operation of a fuel cell to generate electricity, wherein the fuel cell comprises a first electrochemical cell including a first anode and a first cathode; a second electrochemical cell including a second anode and a second cathode; and an interconnect configured to conduct a flow of electrons from the first anode to the second cathode, wherein the interconnect comprises a first portion and a second portion, wherein the first portion is closer to the anode than the second portion, and the second portion is closer to the cathode than the first portion, wherein the first portion comprises one or more of doped ceria, doped lanthanum chromite, and doped yttrium chromite, and wherein the second portion comprises one or more of a Co—Mn spinel and a $ABO_3$ perovskite.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

The description herein makes reference to the accompanying drawings wherein like reference numerals refer to like parts throughout the several views.

Referring to the drawings, some aspects of a non-limiting example of a fuel cell system in accordance with an embodiment of the present disclosure is schematically depicted. In the drawing, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

As described above, examples of the present disclosure relates to fuel cells employing one or more interconnects that comprise a first portion and a second portion, where the first portion is closer to the anode than the second portion, and the second portion is closer to the cathode than the first portion, wherein the first portion comprises one or more of doped ceria, doped lanthanum chromite, and doped yttrium chromite, and wherein the second portion comprises one or more of a Co—Mn spinel and a $ABO_3$ perovskite. As the interconnect includes more than one portions or layers of differing composition, the interconnect may be referred to as a "bilayer" interconnect. Examples are not limited to two layers and may include configurations that include more than two layers each with differing compositions.

Anode, electrolyte, and cathode are three components of a solid oxide fuel cell. When configured in a stack with multiple fuel cells, the anode of one cell is connected with cathode of adjacent cell by interconnect. In such cases, the interconnect serves at least two functions: 1) separate fuel and air gas, and 2) transport electrons from anode to cathode. Since an interconnect may be exposed to fuel on one side and air (or other oxidant) on the other side, it may be desirable for the interconnect material to be stable at both low and high $pO_2$. In some examples, a ceramic interconnect may be formed a doped lanthanum chromites. However, under normal fuel cell stack operating conditions, such as high steam conditions, chromite may have stability issue. Moreover, it may be difficult to densify chromite at normal fuel cell processing temperature and constrained firing due to chromite sinterability as well as Cr vapor phase formation in air.

Ceramic interconnects exhibit relatively good long term stability during normal fuel cell operating conditions, e.g., compared to metallic interconnect, and may be lower cost compared to precious metal or precious metal cermet. In some SOFCs, all active layers (anode, electrolyte, primary interconnect which connects adjacent two cells, cathode, and current collector) are screen printed on inert porous ceramic tubes. Firing of these layers is constrained in x-y plane and the shrinkage is only occurred in z (thickness) direction. In this kind of cell technology, fully densification of some layers is challenge. In order to have a reliable fuel cell system, it may be desirable for some layers, such as electrolyte and interconnect, to be dense and substantially gas impermeable to separate fuel gas and air. Doped lanthanum chromite is one ceramic interconnect for planar solid oxide fuel cell design. However, when such a material is applied to some designs, substantially gas impermeable doped lanthanum chromite cannot be achieved at normal fuel cell processing conditions (about 1300-1400 degrees Celsius sintering temperature in air) due to chromite low sinterability and Cr vapor phase formation in air.

In accordance with one or more examples of the disclosure, an interconnect having at least two layers or portions having different compositions may be employed. In some examples, bilayer ceramic interconnect configurations allows the composition of the interconnect on the fuel side to be independent and different from the composition of the interconnect on the air side. Using such a design, the compositions of the interconnect portions on the fuel side and air side may be selected to meet the desirable design requirements, such as, e.g., thermal expansion coefficient (CTE) match and chemical compatibility with anode and cathode side materials, long term stability under fuel cell operating, and/or the densification to separate fuel and air. Using such a interconnect configuration, a bilayer ceramic interconnect can be sintered to be dense, gas impermeable, at normal fuel cell processing conditions. In some examples, materials for bilayer ceramic interconnect on the air side include Co—Mn spinel or LSM perovskite. On fuel side, the interconnect layer may include doped ceria or composites with other high conductive perovskites.

Figure 1:
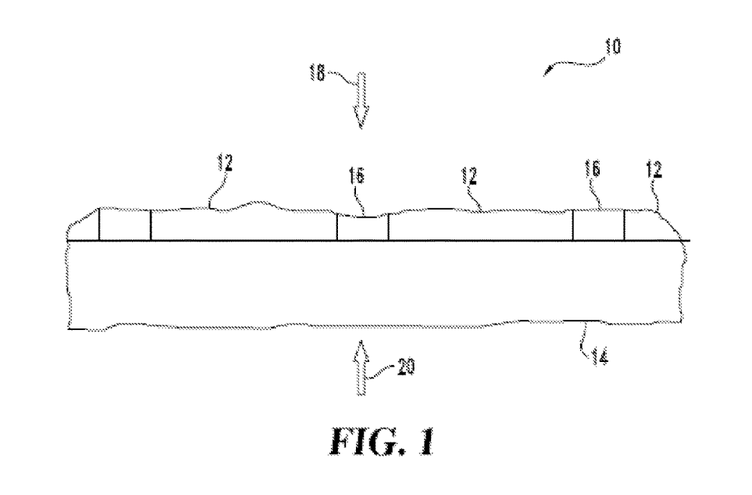
FIG. 1 is a schematic diagram illustrating an example fuel cell system in accordance with an embodiment of the present disclosure.

FIG. 1 is a schematic diagram illustrating an example fuel cell system 10 in accordance with an embodiment of the present disclosure. As shown in FIG. 1, fuel cell system 10 includes a plurality of electrochemical cells 12 (or "individual fuel cells") formed on substrate 14. Electrochemical cells 12 are coupled together in series by interconnects 16. As will be described below, one or more of the plurality of electrochemical cells 12 may include a bi-layer interconnect formed of the example compositions described herein. Fuel cell system 10 is a segmented-in-series arrangement deposited on a flat porous ceramic tube, although it will be understood that the present disclosure is equally applicable to segmented-in-series arrangements on other substrates, such on a circular porous ceramic tube. In various embodiments, fuel cell system 10 may be an integrated planar fuel cell system or a tubular fuel cell system.

Each electrochemical cell 12 includes an oxidant side 18 and a fuel side 20. The oxidant is generally air, but could also be pure oxygen ($O_2$) or other oxidants, e.g., including dilute air for fuel cell systems having air recycle loops, and is supplied to electrochemical cells 12 from oxidant side 18. Substrate 14 may be specifically engineered porosity, e.g., the porous ceramic material is stable at fuel cell operation conditions and chemically compatible with other fuel cell materials. In other embodiments, substrate 14 may be a surface-modified material, e.g., a porous ceramic material having a coating or other surface modification, e.g., configured to prevent or reduce interaction between electrochemical cell 12 layers and substrate 14. A fuel, such as a reformed hydrocarbon fuel, e.g., synthesis gas, is supplied to electrochemical cells 12 from fuel side 20 via channels (not shown) in porous substrate 14. Although air and synthesis gas reformed from a hydrocarbon fuel may be employed in some examples, it will be understood that electrochemical cells using other oxidants and fuels may be employed without departing from the scope of the present disclosure, e.g., pure hydrogen and pure oxygen. In addition, although fuel is supplied to electrochemical cells 12 via substrate 14, it will be understood that in other embodiments, the oxidant may be supplied to the electrochemical cells via a porous substrate.

Figure 2:
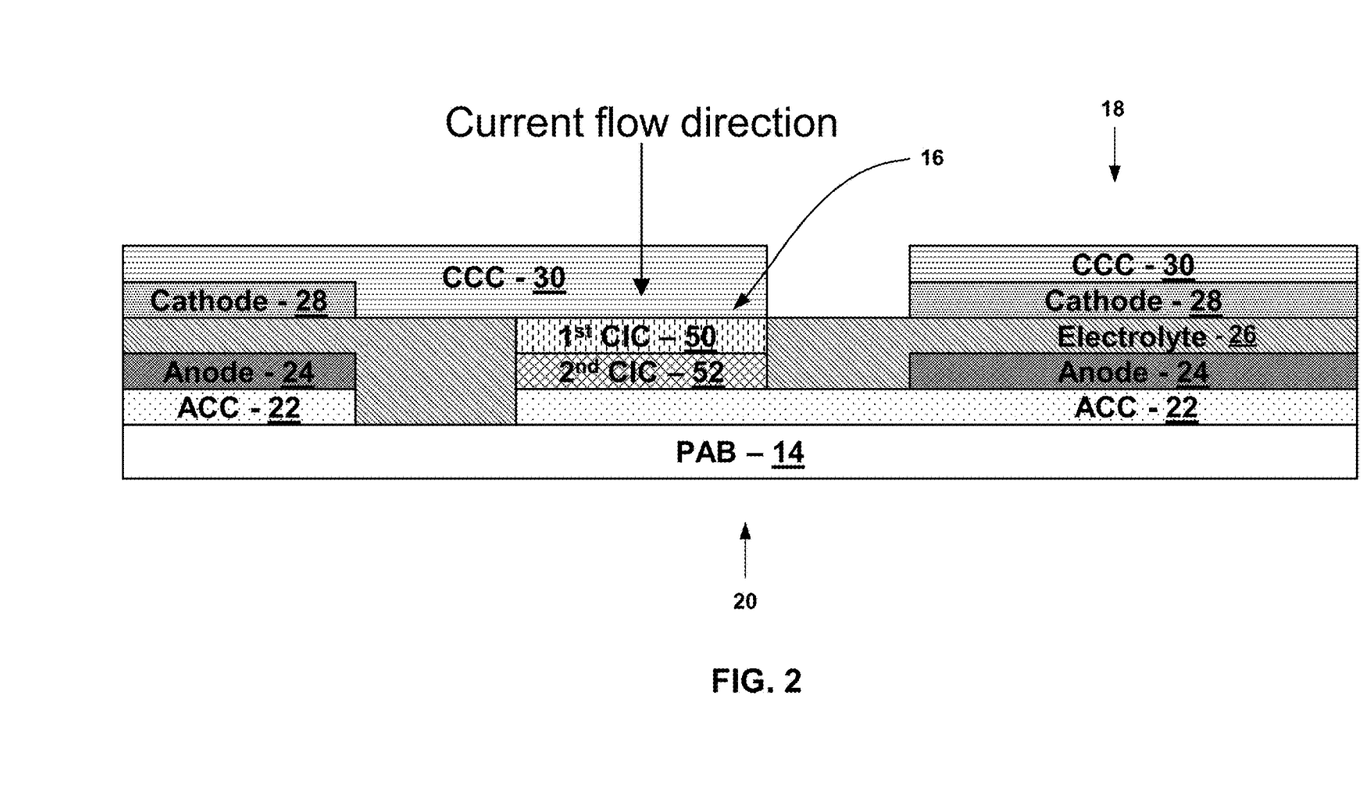
FIG. 2 is a schematic diagram illustrating an example cross section of a fuel cell system in accordance with an embodiment of the present disclosure.

FIG. 2 is a schematic diagram illustrating an example cross section of fuel cell system 10 in accordance with an embodiment of the present disclosure. Fuel cell system 10 may be formed of a plurality of layers screen printed onto substrate (or porous anode barrier layer) 14. This may include a process whereby a woven mesh has openings through which the fuel cell layers are deposited onto substrate 14. The openings of the screen determine the length and width of the printed layers. Screen mesh, wire diameter, ink solids loading and ink rheology may determine the thickness of the printed layers. Fuel cell system 10 layers include an anode conductive layer 22, an anode layer 24, an electrolyte layer 26, a cathode layer 28 and a cathode conductive layer 30. In one form, electrolyte layer 26 may be a single layer or may be formed of any number of sub-layers. It will be understood that FIG. 2 is not necessarily to scale. For example, vertical dimensions are exaggerated for purposes of clarity of illustration.

In each electrochemical cell 12, anode conductive layer 22 conducts free electrons away from anode 24 and conducts the electrons to cathode conductive layer 30 via interconnect 16. Cathode conductive layer 30 conducts the electrons to cathode 28. Interconnect 16 is embedded in electrolyte layer 26, and is electrically coupled to anode conductive layer 22 via second portion 52 (also referred to as $2^{nd}$ CIC) and to cathode conductive layer 30 via first portion 50 (also referred to as $1^{st}$ CIC).

Interconnects 16 for solid oxide fuel cells (SOFC) are preferably electrically conductive in order to transport electrons from one electrochemical cell to another; mechanically and chemically stable under both oxidizing and reducing environments during fuel cell operation; and nonporous, in order to prevent diffusion of the fuel and/or oxidant through the interconnect. If the interconnect is porous, fuel may diffuse to the oxidant side and burn, resulting in local hot spots that may result in a reduction of fuel cell life, e.g., due to degradation of materials and mechanical failure, as well as reduced efficiency of the fuel cell system. Similarly, the oxidant may diffuse to the fuel side, resulting in burning of the fuel. Severe interconnect leakage may significantly reduce the fuel utilization and performance of the fuel cell, or cause catastrophic failure of fuel cells or stacks.

In accordance with one or more examples of the disclosure, interconnect 16 may include two or more layers of different compositions, e.g., first CIC portion 50 and second CIC portion 52. The composition of the interconnect layer nearest cathode 28 and cathode conductive layer 30 (i.e., first CIC portion 52 in FIG. 2) may be tailored to have properties suitable for the oxidant side, such as, a material that is stable and compatible with cathode side materials under air stream, high $pO_2$. Conversely, the composition of the interconnect layer nearest anode 24 and anode conductive layer 22 (i.e., second CIC portion 52 in FIG. 2) may be tailored to have properties suitable for the fuel side, such as, a material that stable and compatible with anode side materials under fuel environment, low $pO_2$. With the configuration shown in FIG. 2 of interconnect 16, interconnect 16 may allow for current flow through the thickness of the interconnect film. This may be desirable in case in which interconnect is formed of ceramic materials, e.g., as compared to precious metal or cermet, due to the comparatively lower conductivity. Such a configuration may be designed to reduce ohmic resistance from bi-layer interconnect 16.

Anode conductive layer 22 may be an electrode conductive layer formed of a nickel cermet, such as such as Ni—YSZ (e.g., where yttria doping in zirconia is 3-8 mol %,), Ni—ScSZ (e.g., where scandia doping is 4-10 mol %, preferably including a second doping for example 1 mol % ceria for phase stability for 10 mol % scandia-$ZrO_2$) and/or Ni-doped ceria (such as Gd or Sm doping), doped lanthanum chromite (such as Ca doping on A site and Zn doping on B site), doped strontium titanate (such as La doping on A site and Mn doping on B site), $La_{1-x}Sr_xMn_yCr_{1-y}O_3$ and/or Mn-based R—P phases of the general formula a $(La_{1-x}Sr_x)_{n+1}Mn_nO_{3n+1}$ Alternatively, it is considered that other materials for anode conductive layer 22 may be employed such as cermets based in part or whole on precious metal. Precious metals in the cermet may include, for example, Pt, Pd, Au, Ag, and/or alloys thereof. The ceramic phase may include, for example, an inactive non-electrically conductive phase, including, for example, YSZ, ScSZ and/or one or more other inactive phases, e.g., having desired coefficients of thermal expansion (CTE) in order to control the CTE of the layer to match the CTE of the substrate and electrolyte. In some embodiments, the ceramic phase may include $Al_2O_3$ and/or a spinel such as $NiAl_2O_4$, $MgAl_2O_4$, $MgCr_2O_4$, and $NiCr_2O_4$. In other embodiments, the ceramic phase may be electrically conductive, e.g., doped lanthanum chromite, doped strontium titanate and/or one or more forms of LaSrMnCrO and/or R—P phases of the general formula $(La_{1-x}Sr_x)_{n+1}Mn_nO_{3n+1}$ Electrolyte layer 26 may be made from a ceramic material. In one form, a proton and/or oxygen ion conducting ceramic, may be employed. In one form, electrolyte layer 26 is formed of YSZ, such as 3YSZ and/or 8YSZ. In other embodiments, electrolyte layer 26 may be formed of ScSZ, such as 4ScSZ, 6ScSz and/or 10Sc1CeSZ in addition to or in place of YSZ. In other embodiments, other materials may be employed. For example, it is alternatively considered that electrolyte layer 26 may be made of doped ceria and/or doped lanthanum gallate. In any event, electrolyte layer 26 is substantially impervious to diffusion therethrough of the fluids used by fuel cell 10, e.g., synthesis gas or pure hydrogen as fuel, as well as, e.g., air or O2 as an oxidant, but allows diffusion of oxygen ions or protons.

Cathode layer 28 may be formed at least one of LSM ($La_{1-x}Sr_xMnO_3$, where x=0.1 to 0.3), $La_{1-x}Sr_xFeO_3$ (such as where x=0.3), $La_{1-x}Sr_xCo_yFe_{1-y}O_3$ (such as $La_{0.6}Sr_{0.4}Co_{0.2}Fe_{0.8}O_3$) and/or $Pr_{1-x}Sr_xMnO_3$ (such as $Pr_{0.8}Sr_{0.2}MnO_3$), although other materials may be employed without departing from the scope of the present invention. For example, it is alternatively considered that Ruddlesden-Popper nickelates and $La_{1-x}Ca_xMnO_3$ (such as $La_{0.8}Ca_{0.2}MnO_3$) materials may be employed.

Cathode conductive layer 30 may be an electrode conductive layer formed of a conductive ceramic, for example, at least one of $LaNi_xFe_{1-x}O_3$ (such as, e.g., $LaNi_{0.6}Fe_{0.4}O_3$), $La_{1-x}Sr_xMnO_3$ (such as $La_{0.75}Sr_{0.25}MnO_3$), and/or $Pr_{1-x}Sr_xCoO_3$, such as $Pr_{0.8}Sr_{0.2}CoO_3$. In other embodiments, cathode conductive layer 30 may be formed of other materials, e.g., a precious metal cermet, although other materials may be employed without departing from the scope of the present invention. The precious metals in the precious metal cermet may include, for example, Pt, Pd, Au, Ag and/or alloys thereof. The ceramic phase may include, for example, YSZ, ScSZ and $Al_2O_3$, or other non-conductive ceramic materials as desired to control thermal expansion.

Any suitable technique may be employed to form electrochemical cell 12 of FIGS. 1 and 2. In the example of FIG. 2, anode conductive layer 22 may be printed directly onto substrate 14, as is a portion of electrolyte 26. Anode layer 24 may be printed onto anode conductive layer 22. Portions of electrolyte layer 26 may be printed onto anode layer 24, and portions of electrolyte layer 26 are printed onto anode conductive layer 22 and onto substrate 14. Cathode layer 28 is printed on top of electrolyte layer 26. Portions of cathode conductive layer 30 are printed onto cathode layer 28 and onto electrolyte layer 26. Cathode layer 28 is spaced apart from anode layer 24 the local thickness of electrolyte layer 26.

Anode layer 24 includes anode gaps separate anode layer 24 into a plurality of individual anodes, one for each electrochemical cell 12. Similarly, cathode layer 28 includes gaps that separate cathode layer 28 into a corresponding plurality of individual cathodes, one for each electrochemical cell 12. Each individual anode and the corresponding cathode that is spaced apart with the portion of electrolyte layer 26 disposed therebetween to form an electrochemical cell 12.

Similarly, anode conductive layer 22 and cathode conductive layer 30 have respective gaps separating anode conductive layer 22 and cathode conductive layer 30 into a plurality of respective anode conductor films and cathode conductor films. The terms, "anode conductive layer" and "anode conductor film" may be used interchangeably, in as much as the latter is formed from one or more layers of the former; and the terms, "cathode conductive layer" and "cathode conductor film" may be used interchangeably, in as much as the latter is formed from one or more layers of the former.

In some examples, anode conductive layer 22 has a thickness of approximately 5-15 microns, although other values may be employed without departing from the scope of the present disclosure. For example, it is considered that in other embodiments, the anode conductive layer may have a thickness in the range of approximately 5-50 microns. In yet other embodiments, different thicknesses may be used, e.g., depending upon the particular material and application.

Similarly, anode layer 24 may have a thickness of approximately 5-20 microns, although other values may be employed without departing from the scope of the present invention. For example, it is considered that in other embodiments, the anode layer may have a thickness in the range of approximately 5-40 microns. In yet other embodiments, different thicknesses may be used, e.g., depending upon the particular anode material and application.

Electrolyte layer 26 may have a thickness of approximately 5-15 microns with individual sub-layer thicknesses of approximately 5 microns minimum, although other thickness values may be employed without departing from the scope of the present invention. For example, it is considered that in other embodiments, the electrolyte layer may have a thickness in the range of approximately 5-40 microns. In yet other embodiments, different thicknesses may be used, e.g., depending upon the particular materials and application.

Cathode layer 28 has a thickness of approximately 10-20 microns, although other values may be employed without departing from the scope of the present invention. For example, it is considered that in other embodiments, the cathode layer may have a thickness in the range of approximately 10-50 microns. In yet other embodiments, different thicknesses may be used, e.g., depending upon the particular cathode material and application.

Cathode conductive layer 30 has a thickness of approximately 5-100 microns, although other values may be employed without departing from the scope of the present invention. For example, it is considered that in other embodiments, the cathode conductive layer may have a thickness less than or greater than the range of approximately 5-100 microns. In yet other embodiments, different thicknesses may be used, e.g., depending upon the particular cathode conductive layer material and application.

Although not shown in FIG. 2, in some examples, fuel cell system 10 may include one or more chemical barrier layers between interconnect 16 and adjacent components to reduce or prevent diffusion between the interconnect and adjacent components, e.g., an anode and/or an anode conductor film and/or cathode and/or cathode conductor film, may adversely affect the performance of certain fuel cell systems. In various embodiments, such a chemical barrier layer may be configured to prevent or reduce material migration or diffusion at the interface between the interconnect and an anode, and/or between the interconnect and an anode conductor film, and/or between the interconnect and a cathode, and/or between the interconnect and a cathode conductor film which may improve the long term durability of the interconnect. For example, without a chemical barrier, material migration (diffusion) may take place at the interface between an interconnect formed of a precious metal cermet, and an anode conductor film and/or anode formed of a Ni-based cermet. The material migration may take place in both directions, e.g., Ni migrating from the anode conductive layer/conductor film and/or anode into the interconnect, and precious metal migrating from the interconnect into the conductive layer/conductor film and/or anode. The material migration may result in increased porosity at or near the interface between the interconnect and the anode conductor film and/or anode, and may result in the enrichment of one or more non or low-electronic conducting phases at the interface, yielding a higher area specific resistance (ASR), and hence resulting in reduced fuel cell performance. Material migration between the interconnect and the cathode and/or between the interconnect and the cathode conductor film may also or alternatively result in deleterious effects on fuel cell performance. Such a chemical barrier layer may be formed of one or both of two classes of materials; cermet and/or conductive ceramic.

Figure 3:
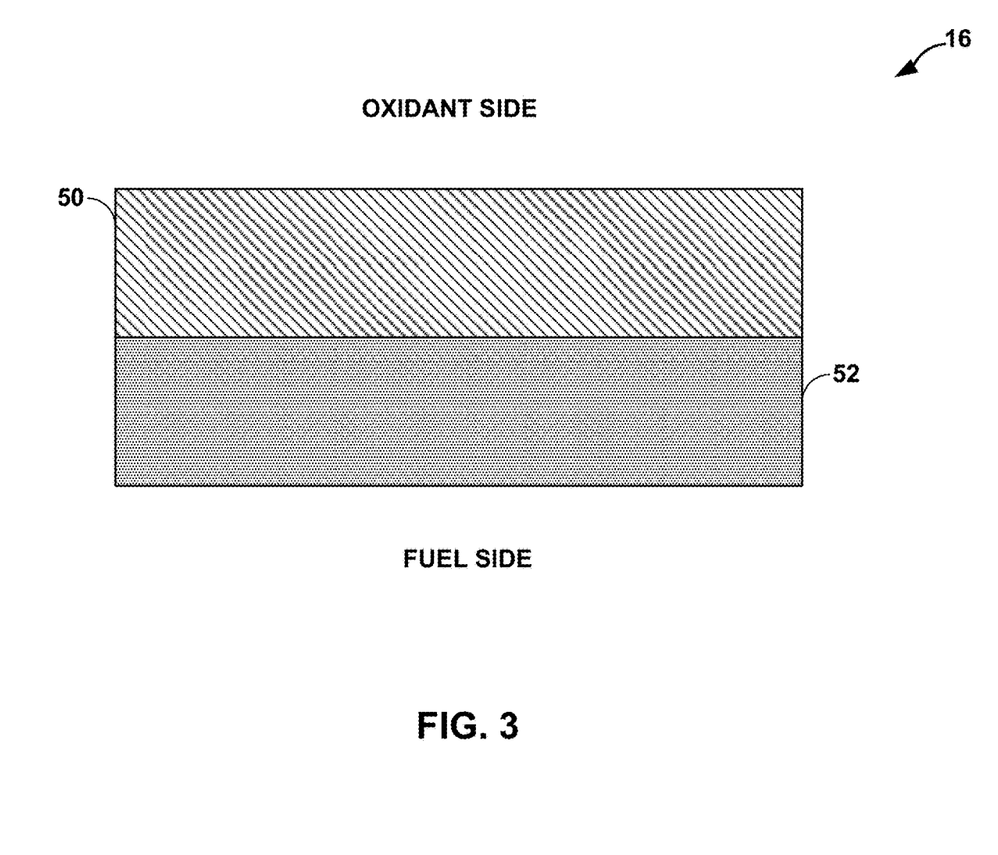
FIG. 3 is a schematic diagram illustrating a cross section of an example bi-layer interconnect.

FIG. 3 is a schematic diagram illustrating an example cross section of bi-layer interconnect 16. Interconnect 16 includes first portion 50 nearest the oxidant side 18 (and cathode and cathode conductive layer) and second portion 52 nearest the fuel side 20 (and anode and anode conductive layer). As described herein, first and second portions 50, 52 may be formed of different compositions. Second portion 52 may be formed of a material that is stable and compatible with anode side materials under fuel environment, low $pO_2$. First portion 50 may be formed of a material that is stable and compatible with cathode side materials under air stream, high $pO_2$. In some examples, low $pO_2$ refers to fuel side from about $10^{-16}$ atm (outlet fuel) to about $10^{-21}$ atm (inlet fuel, depending the fuel type used), and high $pO_2$ refers to cathode side from about 0.1 atm (dilute air) to 0.21 atm (air).

The term "stable" may refer to keeping the phase stable without decomposition. For example, most perovskites, such as LSM and LNF, will decompose into other phases when $pO_2$ is lower than about $10^{-14}$ atm. Due to such decomposition, LSM, and the like, may only be used on the air side in some instances. Conversely, a composition such as $SrTiO_3$ is stable under such low $pO_2$ conditions. The term "compatible" may refer to a selected interconnect composition not having chemical reactions with other fuel cell materials to form undesired new phases. For example, LSM composition has a range, $(La_{1-x}Sr_x)_yMnO_3$, x in the range of 0.1 to 0.5, y in the range of 0.9 to 1.2. If LSM has stoichiometric composition (y=1) or A site (La/Sr position) rich (y>1), the LSM tends to interact with electrolyte at higher sintering temperature to form an insulating phase, $La_2Zr_2O_7$.

As described herein, second portion 52 may be formed of one or more of doped ceria, doped lanthanum chromite, and doped yttrium chromite. Example anode side materials suitable for forming second portion 52 include:

1. Doped ceria such as $(R_xCe_{1-x})O_2$, 0<x<0.5, R is rare earth metal, such as Gd, Sm, Y, Pr, Nd, and Yb.
2. Co-doped ceria such as $(R_xM_yCe_{1-x-y})O_2$, R is rare earth metal, 0<x<0.5, M is transition metals, 0<y<0.1, such as Mn, Fe, Co, Ni, Cu, Al, and the like.
3. Doped ceria with modifier such as $w(R_xM_yCe_{1-x-y})O_2$-(1-w)N, R is rare earth metal, 0<x<0.5, M is transition metals, 0<y<0.1, N is alkali metal, or alkaline earth metal, 0<w<0.1, such as Li, Na, K, Mg, Ca, Sr, and the like.
4. Doped ceria-perovskite composite. In some examples, the perovskite can be doped $SrTiO_3$, or $(Sr_{1-x}A_x)(Ti_{1-y}M_y)O_3$, A is alkaline metal or rare earth metal, such as Ca, Sr, Y, La. M is transition metal, such as Mn, Cr, Co, Ni, Cu, Zn, and V.
5. Doped lanthanum or yttrium chromite, such as $(La_{1-x}Ax)(Cr_{1-y}M_y)O_3$, A is alkaline earth metal (0<x<0.3), such as Ca, Sr. M is transition metal, such as Mn, Ti, Co, Fe, Ni, Cu, Zn, V, and the like.

Each of the above example materials may be stable and compatible with anode side materials under fuel environment, low $pO_2$ conditions. In one example, second portion 52 may consist essentially of one or more of doped ceria, doped lanthanum chromite, and doped yttrium chromite, where any additional material in present only in an amount that does not alter one or more properties of the material in a manner that does not allow second portion 52 to function as described herein.

Conversely, first portion 50 may be formed of one or more of a Co—Mn spinel and a $ABO_3$ perovskite. Example cathode side materials for first layer 50 may include:

1. $(Mn,Co)_3O_4$ spinel
2. $(Mn,Co,A)_3O_4$ spinel, A is transition metal, such as Cu, Co, Cr, Al, and the like.
3. $ABO_3$ perovskite, such as LSM, LNF, PSM, LSC, LSCF, R—P nickelate, and the like.
4. $(Mn,Co,Ax)_3O_4$-$ABO_3$ composite, A is transition metal, $0<x<0.1$ such as $(Mn,Co,Ax)_3O_4$-LNF, $(Mn,Co,Ax)_3O_4$-LSM.
5. $(Mn,Co,Ax)_3O_4$-doped ceria composite, A is transition metal, $0<x<0.1$.

Each of the above example materials for first portion 50 may be stable and compatible with cathode side materials under air stream, high $pO_2$ conditions. In one example, first portion 50 may consist essentially of one or more of a Co—Mn spinel and a $ABO_3$ perovskite, where any additional material in present only in an amount that does not alter one or more properties of the material in a manner that does not allow first portion 50 to function as described herein.

First portion 50 and second portion 52 may have any suitable thicknesses. In some examples, the first portion defines a first thickness and the second portion defines a second thickness, wherein the first thickness of first portion may be thinner or thicker than, or same as, second portion, depending on the materials used, to control the $pO_2$ at the interface of the first and second portions in desired range. For example, to keep high electronic conductivity and phase stability of interconnect 16, the $pO_2$ at the interface of the two portions of the interconnect prefers to be in the range of $10^{-11}$ to $10^{-14}$ atm. To achieve this target, one layer of the bilayer interconnect may be designed to be thicker than another to control oxygen flux since oxygen flux is related to both material property (oxygen permeability) and material thickness.

In some examples, second portion 52 defines a thickness in the range of about 5 to 100 microns, preferably in the range of about 10-20 microns. In some examples, the thickness of the first portion 50 is in the range of 5 to about 50 microns, preferably in the range of about 10-20 microns.

EXAMPLES

Various experiments were carried out to evaluate one or more aspects of example anode compositions in accordance with the disclosure. However, examples of the disclosure are not limited to the experimental anode compositions.

Figure 4:
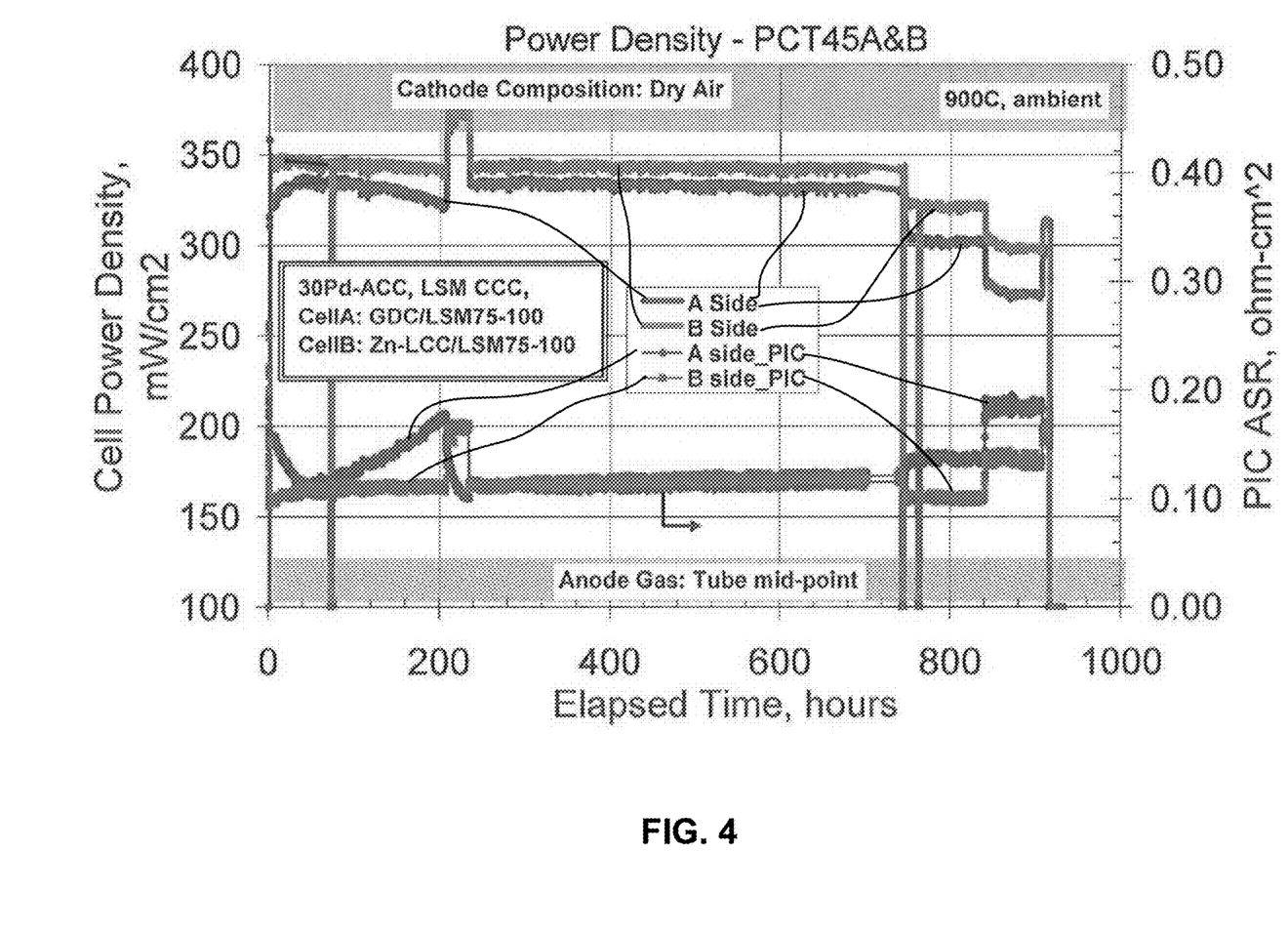
FIGS. 4 and 5 are plots illustrating one or more aspects of the disclosure.

Bilayer ceramic interconnect using LSM (air side)/GDC (fuel side) or LSM(air side)/Zn-doped $La_{0.7}Ca_{0.3}CrO_3$ (fuel side) materials set was evaluated in subscale cells (5 cells connected in series by bilayer ceramic interconnect) of IP-SOFC design. The ASR contribution from bilayer ceramic interconnect is ~0.1 ohm-cm² under reformate fuel and 900 degrees Celsius with reasonable good stability. FIG. 4 is a plot illustrating the durability of 5-cell test article with bilayer ceramic interconnect at about 900 degrees Celsius and reformate fuel.

Examples of the disclosure may include doped ceria or doped ceria composite, or doped ceria cermet as the fuel side layer for bilayer ceramic interconnect. Doped ceria may be a candidate of electrolyte materials and its long stability with anode side materials has been demonstrated. Its electronic conductivity increases quickly with decreasing $pO_2$. Measurements show GDC's conductivity at low $pO_2$ is about 2 S/cm. If a doped GDC layer is 10 microns and the current flow through the interconnect film, then the ASR contribution from GDC layer was determined to be only about 0.0005 ohm-cm². $(Mn,Co)_3O_4$ or $(Mn,Co)_3O_4$ composite may be employed as the air side layer of bilayer ceramic interconnect. This material may be used as coating of metallic interconnect to prevent oxidation of metallic interconnect when operating at high temperatures in air. Long term durability of the material in air was demonstrated.

Figure 5:
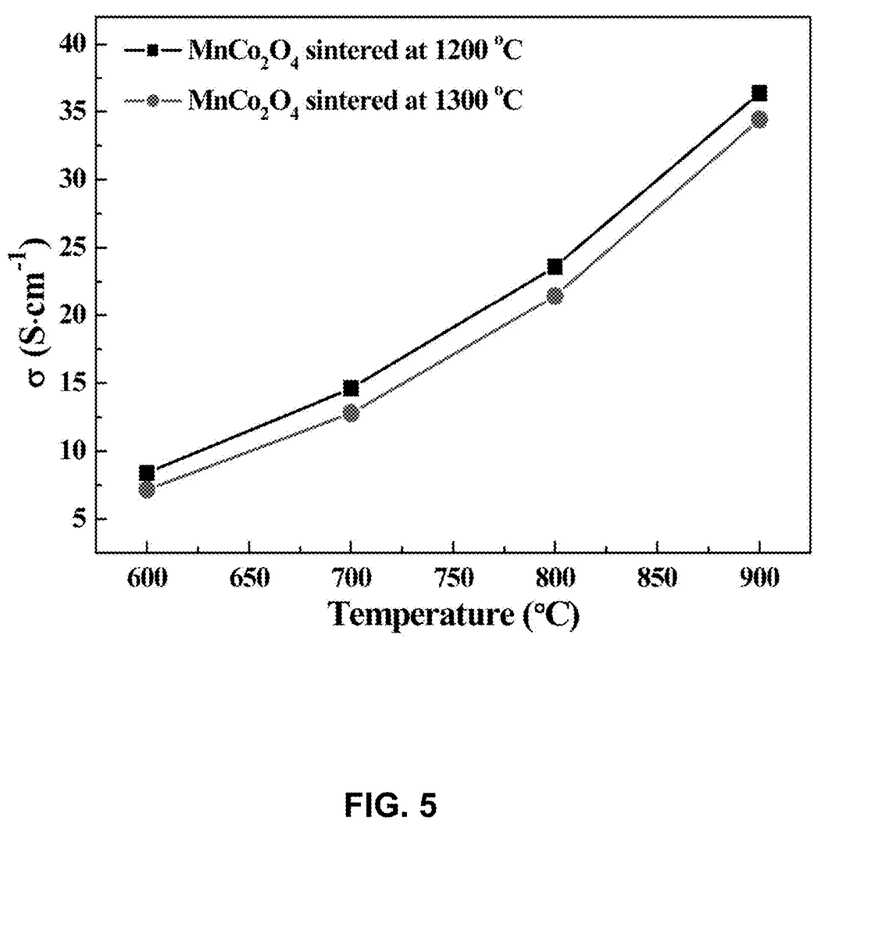

FIG. 5 is a plot of the electrical conductivity of $MnCo_2O_4$ samples sintered at 1200 degrees Celsius and 1300 degrees Celsius as a function of temperature (from reference: Eun Jeong Yi, Mi Young Yoon, Ji-Woong Moon, and Hae Jin Hwang, Fabrication of a MnCo2O4/gadolinia-doped Ceria (GDC) Dual-phase Composite Membrane for Oxygen Separation, J of the Korean Ceramic Society, 47[2]199-204, 2010). FIG. 5 shows that the electrical conductivity of $MnCo_2O_4$ spinel may be from about 10 S/cm at 600 degrees Celsius to about 30 S/cm at 900 degrees Celsius in air, which is much higher than GDC materials and lower ASR contribution is expected. $(Mn,Co)_3O_4$ spinel can be densified from about 1200-1300 degrees Celsius within the temperature range for fuel cell processing. By forming the composite, sintering temperature can be adjusted if needed. To ensure higher conductivity of each layer, the $pO_2$ distribution through thickness (especially at the interface of the two layers) of bilayer ceramic interconnect can be controlled through individual layer thickness or controlling oxygen permeation flux through each layer by doping or forming composite. This technical approach has been demonstrated by Eun Jeong et al. (Eun Jeong Yi, Mi Young Yoon, Ji-Woong Moon, and Hae Jin Hwang, Fabrication of a MnCo2O4/gadolinia-doped Ceria (GDC) Dual-phase Composite Membrane for Oxygen Separation, J of the Korean Ceramic Society, 47[2]199-204, 2010).

Various embodiments of the invention have been described. These and other embodiments are within the scope of the following claims.

The invention claimed is:

1. A fuel cell comprising:
   a first electrochemical cell including a first anode, a first cathode, and a first anode conductive layer;
   a second electrochemical cell including a second anode, a second cathode, and a second cathode conductive layer; and
   a ceramic interconnect embedded in an electrolyte layer and configured to conduct a flow of electrons from the first anode to the second cathode through the first anode conductive layer and the second cathode conductive layer,
   wherein the interconnect comprises a first individual ceramic layer and a second individual ceramic layer directly adjacent to the first individual ceramic layer, wherein the first individual ceramic layer is closer to the first anode than the second individual ceramic layer, and the second individual ceramic layer is closer to the second cathode than the first individual ceramic layer, wherein the first individual ceramic layer and second individual ceramic layer separate fuel gas on an anode side of the fuel cell from oxidant gas on the cathode side of the fuel cell,
   wherein the first anode conductive layer is between the first individual ceramic layer and the first anode, and is electrically coupled to the first individual ceramic layer and the first anode,
   wherein the second cathode conductive layer is between the second individual ceramic layer and the second cathode, and is electrically coupled to the second individual ceramic layer and the second cathode, wherein the first individual ceramic layer consists essentially of one or more of doped ceria, doped ceria-perovskite composite material, doped lanthanum chromite, and doped yttrium chromite, and wherein the second individual ceramic layer comprises one or more of a Co—Mn spinel and a $ABO_3$ perovskite.

2. The fuel cell of claim 1, wherein the first individual ceramic layer comprises doped ceria having the chemical formula $(R_xCe_{1-x})O_2$, where R is a rare earth metal, $0<x\leq0.5$.

3. The fuel cell of claim 1, wherein the first individual ceramic layer comprises doped ceria having the chemical formula $(R_xM_yCe_{1-x-y})O_2$, where R is a rare earth metal, M is a transition metal, $0<x\leq0.5$ and $0\leq y<0.1$.

4. The fuel cell of claim 1, wherein the individual first ceramic layer comprises doped ceria having the chemical formula $w(R_x\,M_y\,Ce_{1-x-y})O_2-(1-w)N$, where R is a rare earth metal, M is a transition metal, N is an alkali metal or alkaline earth metal, $0<x\leq0.5$, $0\leq y<0.1$, and $0<w\leq0.1$.

5. The fuel cell of claim 1, wherein the first individual ceramic layer consists essentially of the doped ceria-perovskite composite material.

6. The fuel cell of claim 5, wherein the doped ceria-perovskite composite material comprises $SrTiO_3$ or $(Sr_{1-x}A_x)(Ti_{1-y}M_y)O_3$, where A is an alkaline metal or rare earth metal, and M is a transition metal.

7. The fuel cell of claim 5, wherein the perovskite comprises doped lanthanum chromite having the chemical formula $(La_{1-x}A_x)(Cr_{1-y}M_y)O_3$, where A is an alkaline metal, M is a transition metal, and $0<x\leq0.3$.

8. The fuel cell of claim 1, wherein the first individual ceramic layer consists essentially of the doped lanthanum chromite having the chemical formula $(La_{1-x}A_x)(Cr_{1-y}M_y)O_3$, where A is an alkaline metal, M is a transition metal, and $0<x\leq0.3$, $0<y\leq0.5$.

9. The fuel cell of claim 1, wherein the individual second ceramic layer comprises a $(Mn, Co, A)_3O_4$ spinel, where A is a transition metal.

10. The fuel cell of claim 1, wherein the second individual ceramic layer comprises the $ABO_3$ perovskite, wherein the $ABO_3$ perovskite comprises one or more of LSM $((La_{1-x}Sr_x)MnO_3)$, LNF $(La(Ni_{1-y}Fe_y)O_3)$, PSM $((Pr_{1-x}Sr_x)MnO_3)$, LSC $((La_{1-x}Sr_x)CoO_3)$, LSCF $((La_{1-x}Sr_x)(Co_{1-y}Fe_y)O_3)$, and R—P nickelate.

11. The fuel cell of claim 1, wherein the second individual ceramic layer comprises a $(Mn, Co, A_x)_3O_4$ spinel—$ABO_3$ perovskite composite, where A is a transition metal, and $0\leq x\leq0.1$.

12. The fuel cell of claim 11, wherein the composite comprises one or more of $(Mn, Co, A_x)_3O_4$—LNF and $(Mn, Co, A_x)_3O_4$—LSM.

13. The fuel cell of claim 1, wherein the second individual ceramic layer comprises a $(Mn, Co, A_x)_3O_4$ spinel—ionic phase composite, where A is a transition metal, and $0\leq x\leq0.1$.

14. The fuel cell of claim 13, wherein the ionic phase comprises one or more of doped ceria, Y or Sc stabilized zirconia.

15. The fuel cell of claim 1, wherein the first individual ceramic layer and the second individual ceramic layer are adjacent to each other along an interface, wherein the first individual ceramic layer defines a first thickness and the second individual ceramic layer defines a second thickness, wherein the first thickness and the second thickness are such that the $pO_2$ at the interface of the first individual ceramic layer and the second individual ceramic layer in a range of $1.01325e^{-6}$ pascal to $1.01325^{-9}$ pascal.

16. The fuel cell of claim 1, wherein the first individual ceramic layer defines a first thickness and the second individual ceramic layer defines a second thickness, wherein the first thickness is in the range of about 5 microns to about 100 microns, and the second thickness is in the range of about 5 microns to about 50 microns.

17. The fuel cell of claim 1, wherein the second individual ceramic layer comprises a $(Mn, Co)_3O_4$ spinel.

18. A method for manufacturing a fuel cell, the method comprising forming a fuel cell structure, the fuel cell structure comprising:

a first electrochemical cell including a first anode and a first cathode;

a second electrochemical cell including a second anode and a second cathode; and a ceramic interconnect configured to conduct a flow of electrons from the first anode to the second cathode, wherein the interconnect comprises a first individual ceramic layer and a second individual ceramic layer directly adjacent to the first individual ceramic layer, wherein the first individual ceramic layer is closer to the first anode than the second individual ceramic layer, and the second individual ceramic layer is closer to the second cathode than the first individual ceramic layer, wherein the first individual ceramic layer and second individual ceramic layer separate fuel gas on an anode side of the fuel cell from oxidant gas on the cathode side of the fuel cell, wherein the first individual ceramic layer comprises one or more of doped ceria, doped lanthanum chromite, and doped yttrium chromite, and wherein the second individual ceramic layer comprises one or more of a Co—Mn spinel and a $ABO_3$ perovskite.

19. A method comprising controlling operation of a fuel cell to generate electricity, wherein the fuel cell comprises:

a first electrochemical cell including a first anode and a first cathode;

a second electrochemical cell including a second anode and a second cathode; and a ceramic interconnect configured to conduct a flow of electrons from the first anode to the second cathode, wherein the interconnect comprises a first individual ceramic layer and a second individual ceramic layer directly adjacent to the first individual ceramic layer, wherein the first individual ceramic layer is closer to the first anode than the second individual ceramic layer, and the second individual ceramic layer is closer to the second cathode than the first individual ceramic layer, wherein the first individual ceramic layer and second individual ceramic layer separate fuel gas on an anode side of the fuel cell from oxidant gas on the cathode side of the fuel cell, wherein the first individual ceramic layer comprises one or more of doped ceria, doped lanthanum chromite, and doped yttrium chromite, and wherein the second individual ceramic layer comprises one or more of a Co—Mn spinel and a $ABO_3$ perovskite.

20. The fuel cell of claim 1, wherein the second individual ceramic layer consists essentially of the one or more of a Co—Mn spinel and a $ABO_3$ perovskite.

* * * * *